United States Patent [19]
Brandt et al.

[11] 3,849,286

[45] Nov. 19, 1974

[54] TREATMENT OF THERMOPLASTIC TUBING

[75] Inventors: Roger Brandt, Wayland; John William Piltzecker, Shrewsbury, both of Mass.

[73] Assignee: American Can Company, New York, N.Y.

[22] Filed: Dec. 13, 1962

[21] Appl. No.: 244,322

[52] U.S. Cl.................. 250/325, 204/165, 264/22, 264/25, 264/327, 264/348, 250/543
[51] Int. Cl. ...................... C08f 47/22, B29d 23/04
[58] Field of Search .......... 204/165, 168, 312, 323; 118/14 A; 117/47 R, 93.1; 264/22, 25, 237, 327, 348

[56] References Cited
UNITED STATES PATENTS

| | | | |
|---|---|---|---|
| 3,017,339 | 1/1962 | Dewey | 204/165 |
| 3,057,013 | 10/1962 | Loveless | 264/348 |
| 3,103,409 | 9/1963 | Bohres et al. | 264/327 |

*Primary Examiner*—F. C. Edmundson
*Attorney, Agent, or Firm*—Robert P. Auber

EXEMPLARY CLAIM

1. Apparatus for the surface treatment and sizing of thermoplastic tubing formed by extruding heated thermoplastic material through an annular nozzle, comprising:

an elongate, internal forming member mountable at the nozzle of the extruder in closely adjacent, coaxial alignment with the extruder nozzle;

electrode means encircling said forming member in spaced relation thereto;

means for continuously passing said tubing along said forming member in tight fitting relation therewith to size said tubing;

means for impressing a high alternating voltage between said electrode means and said forming member while said tubing is being sized to produce a corona discharge treatment of the exterior surface of said tubing; and means for cooling said tubing as it leaves the corona discharge zone, including means for internally cooling said forming member for progressively cooling the interior of said tubing, and coolant spray means disposed away from said electrode means in the direction of the discharge end of said forming member for directing a coolant spray over the exterior of said tubing.

3 Claims, 5 Drawing Figures

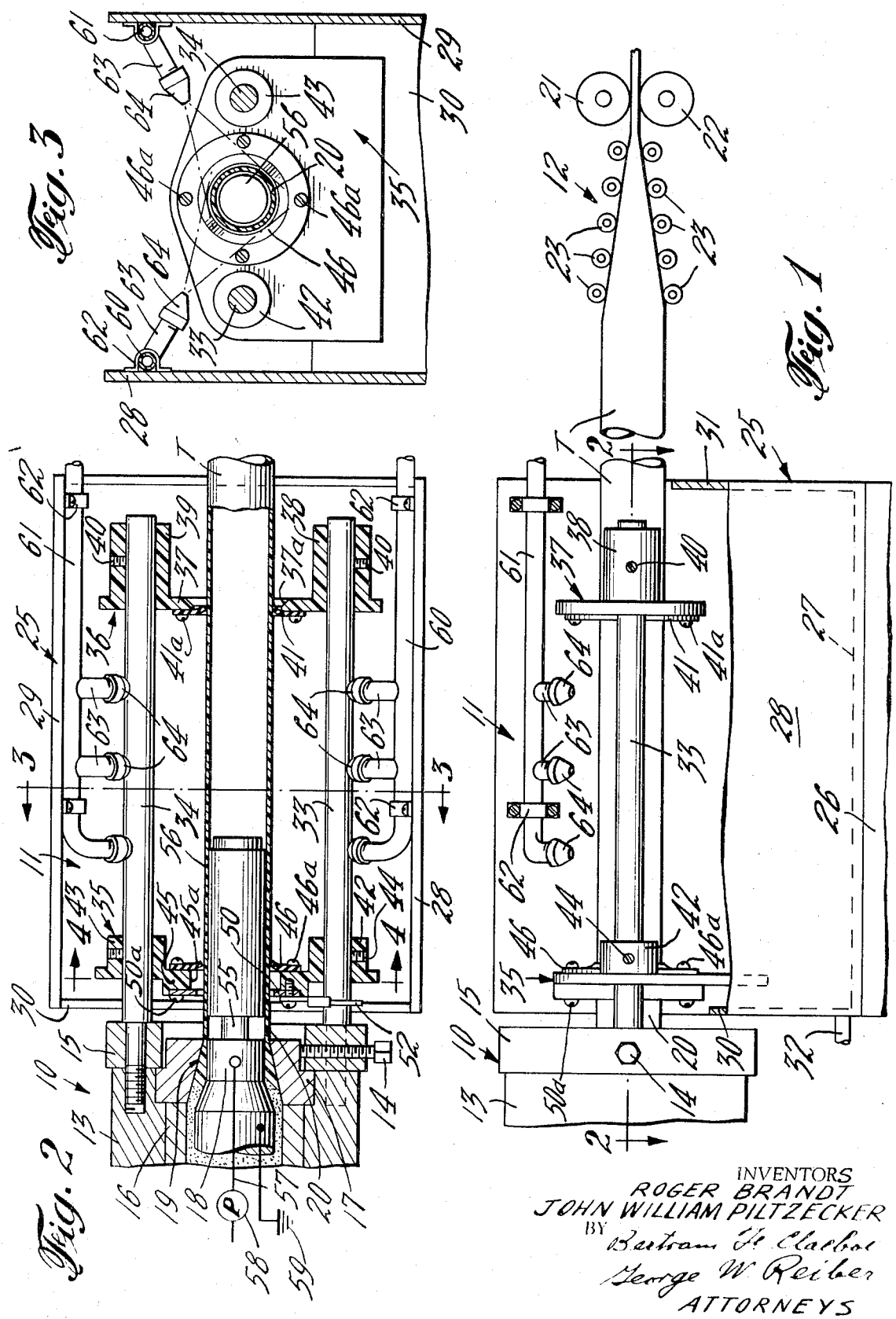

INVENTORS
ROGER BRANDT
JOHN WILLIAM PILTZECKER
BY Bertram F. Claeboe
George W. Reiber
ATTORNEYS

TREATMENT OF THERMOPLASTIC TUBING

The present invention relates broadly to the production of thermoplastic tubing, and is more particularly concerned with the corona discharge treatment of such tubing during the extrusion thereof, accomplished in a novel manner which assures that no treatment will be applied to the inner surfaces of the tubing.

It is known that thermoplastic materials as exemplified by polyolefins require a surface treatment to improve their receptivity to inks, adhesives and the like, and currently one technique which is rather extensively employed for this purpose is the application of a high voltage electrical stress accompanied by corona discharge. As this process is used in the treatment of tubing formed of polyethylene and like materials during the process of manufacturing tubular containers, it is customary to slide a thermoplastic sleeve of a length approximating the finished tube body onto a mandrel in adjacency to a bar electrode and create an electrical corona discharge between the electrode and mandrel.

However, by reason of the necessary loose fitting relation between the tubular sleeve and mandrel and the further fact that the sleeve is not always positioned in the same precise location relative to the electrode, the inner surface of the sleeve is often also treated along a band area at one or both of the opposite ends thereof. Disadvantageously, this interferes first of all with subsequent heat sealing of one end of the tube body after product is filled therein, and secondly, prevents formation of an adequate bond between the upper inner end of the sleeve and the thermoplastic headpiece, whether it be formed and fused to the sleeve by injection or compression molding or attached as a preformed unit by heat sealing.

It is accordingly an important aim of the present invention to provide a process and apparatus for producing thermoplastic tubing featuring the application of corona discharge during the extrusion thereof and while the tubing is being drawn along a forming member in tight fitting relation therewith so as to preclude corona treatment of the inner surfaces thereof.

Another object of this invention lies in the provision of a corona discharge treatment technique which is practiced upon a continuous length of axially advancing thermoplastic tubing while the tubing is in its formative stages and supported upon a sizing member in air gap-free relation thereon.

Still another object of the instant invention is to provide a surface treatment process of the foregoing character, wherein corona discharge is applied while internal sizing of the tubing is being effected and prior to final external sizing thereof.

A further object of the present invention lies in the provision of a method for producing thermoplastic tubing, including the steps of extruding a heated mass of thermoplastic material through an annular orifice and onto a forming member in concentrically spaced relation with electrode means to provide on the forming member a continuous length of thermoplastic tubing in tight fitting relation therewith, and while the tubing is on the forming member, impressing a high value alternating voltage between the electrode means and forming member to produce a corona discharge.

Other objects and advantages of the invention will become more apparent as the description proceeds, particularly when taken in connection with the accompanying drawings.

In the drawings, wherein like numerals are employed to designate like parts throughout the same:

FIG. 1 is a side elevational view of exemplary apparatus for practicing the process aspects of the invention, parts thereof being broken away and other parts being taken in section to more fully illustrate certain details;

FIG. 2 is a horizontal sectional view taken substantially along the line 2—2 of FIG. 1;

Figure 4:
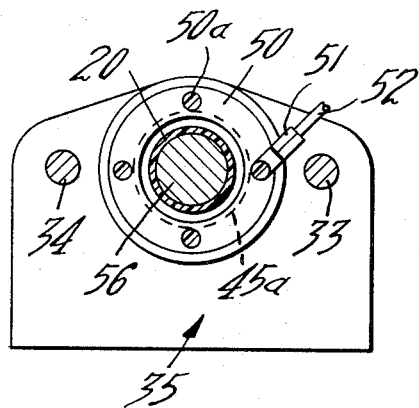
Figure 5:
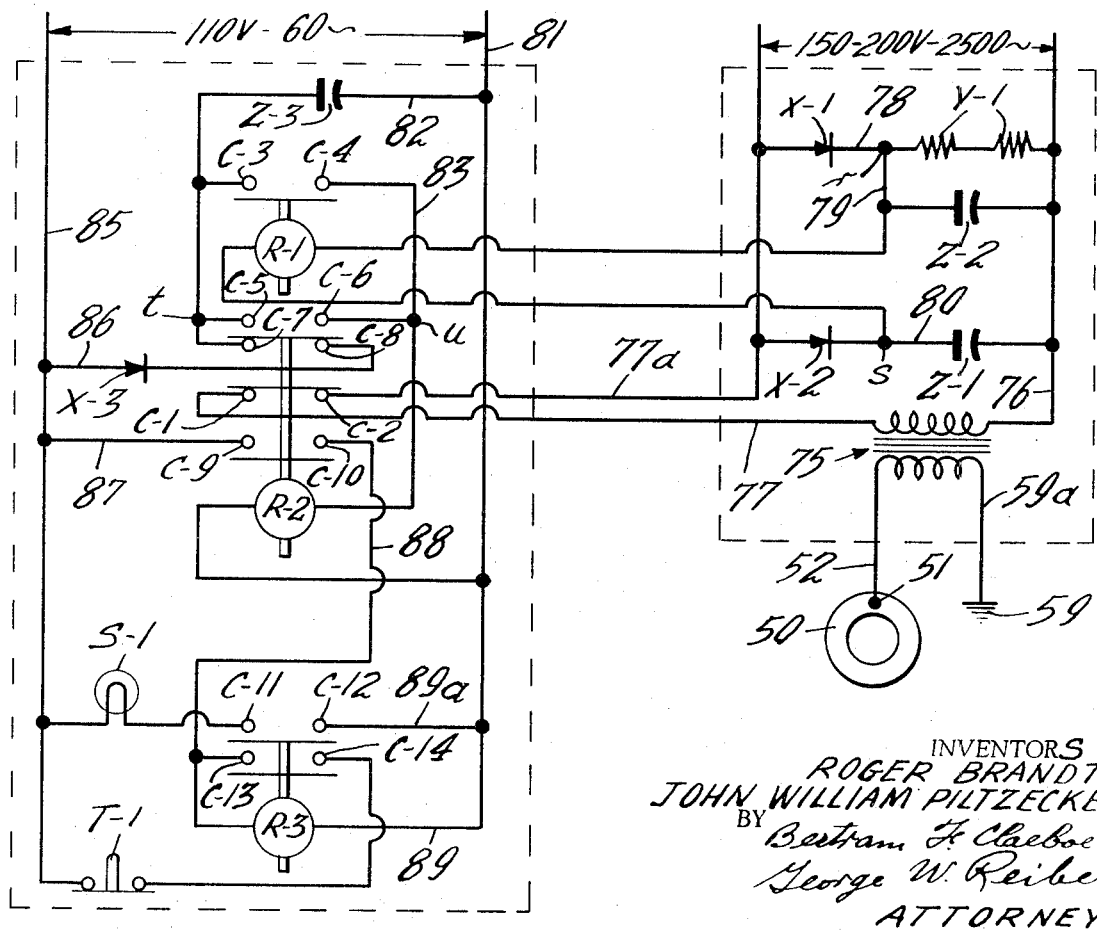

FIGS. 3 and 4 are vertical sectional views taken substantially along the lines 3—3 and 4—4, respectively, of FIG. 2; and FIG. 5 is a schematic diagram of electrical circuitry which may be utilized to terminate the corona treatment in the event of a short circuit condition.

Referring now to FIGS. 1 to 4 of the drawings, an illustrative form of tube forming and treating apparatus is designated generally therein by the legend A and comprises essentially an extrusion section 10, a tube treating and sizing section 11, and a tube drawing or pulling section 12. The first and last-mentioned sections 10 and 12 are of conventional construction, and the extrusion section may be provided by a die housing 13 mounting by bolt means or the like 14 cap or cover means 15. The die housing suitably supports therewithin an annular mold member 16 abutting an annular female die member 17 which defines with a male die member 18 an annular extrusion orifice 19 through which is expressed a forming thermoplastic tubular mass 20 providing after passage through the treating and sizing section 11 a continuous length of thermoplastic tubing T of established inner and outer diameters. As is conventional, the extruder incorporates interiorly screw means (not shown) for forcing the heated thermoplastic material through the orifice 19 and the tubing is drawn or pulled through the treating and sizing station 11 under action of driven rolls 21 and 22 between which the tubing T is directed by a plurality of guide rolls 23.

The corona treating and tube sizing station 11, to which the instant invention is particularly directed, comprises a tank-like housing 25 supported upon a base 26 and having a bottom wall 27 from which are erected a pair of opposed side walls 28 and 29 and a pair of opposed end walls 30 and 31. The end wall 30 may be equipped with a drain connection 32 therein, and extending from and above this same wall is a pair of rod members 33 and 34 threadably received at one end in the extrusion die housing 13. The rod members 33 and 34 function to support in axially adjustable relation therealong a pair of wiping members generally designated at 35 and 36, the latter taking the form of a plate member 37 centrally apertured at 37a and integrally connecting with a pair of collar portions 38 and 39 receiving set screws or like means 40. As appears in FIG. 2, the plate member 37 on the upstream face thereof mounts by fastening means 41a a wiper ring 41 sized slightly smaller than the outer diameter of tubing T so as to remove the major amount of coolant applied in a manner which will be shortly described. Of course, the second wiping member 36 may be supplemented by an air ring (not shown) or like device located downstream therefrom.

The first wiping member 35, which may additionally function to support a ring electrode 50 as will shortly be noted, is constructed similarly to the wiping member 36 and includes a pair of collar portions 42 and 43 receiving set screw means 44, the collar portions being integral with or otherwise connected to a plate member 45 centrally apertured at 45a. The plate member on its downwstream face supports by fastening means 46a a wiper ring 46, while the upstream surface thereof may mount the electrode 50 by the use of fastening devices 50a. As is shown particularly in FIG. 4, one of the electrode fastening means 50a may provide a connection for a socket member 51 receiving a lead-in wire 52 which connects with circuitry to be described in detail when reference is later made to FIG. 5.

Referring again to FIGS. 1 to 3, the male forming member 18 in the extruder housing 13 connects by a reduced diameter shaft portion 55 with an internal forming mandrel 56 which desirably is slightly gradually tapered from its end adjacent the shaft portion 55 to a reduced diameter at the opposite end thereof, for a purpose which will presently appear. However, it is now to be noted that the mandrel 56 is internally cooled, as by a line connection 57 receiving therein pump means 58 controlling the flow of a coolant such as water for maintaining the exterior of the mandrel at a temperature which assures proper sizing of the inner diameter of the thermoplastic tubing and prevents adherance of the tubing thereto. As also appears in FIG. 2, the corona treating circuit is completed by grounding the mandrel 56, as indicated at 59.

To complete the description of the apparatus included in the treating and sizing station 11, the outer diameter of the forming tubing is caused to become set or firm by sprays of coolant directed thereagainst. Illustrative means for this purpose may take the form of a pair of conduit members 60 and 61 connected to a suitable coolant source (not shown). The conduit members are attached to the upper portion of the side walls 28 and 29 of the tank type housing 25 by clamp means 62, and communicating with the conduits 60 and 61 are a plurality of downwardly and inwardly directed connectors 63 each mounting at its discharge end a nozzle 64. The coolant jets discharged from the nozzles 64 chill the exterior of the forming tubing and set the outer diameter to an established value, since generally the cooling effect of the internal forming mandrel is not sufficient for this purpose.

In operation of the apparatus A described, a heated mass of thermoplastic material is caused to issue from the annular extrusion orifice 19 under action of the extrusion screw (not shown) and the pulling force of the rollers 21 and 22, forming an embryonic tubular shape 20 having inner and outer diameters not yet concentric or sized to the dimensions desired. The tubular shape 20 passes onto the internally cooled forming mandrel 56 and while on the upstream portion thereof is in tight fitting relation therewith and in a plastic condition conducive to effective corona treatment, since while in this condition it appears relatively more simple to break down the molecular structure on the exterior surfaces of the polyolefin tubing, creating the oxide layer conducive to good ink or coating receptivity. Importantly, however, there is no air gap between the tubular plastic shape 20 and mandrel 56 as said shape moves along said mandrel and through the ring electrode 50 in uniformly spaced relation therewith. Desirably, an air gap of between about 0.020 and 0.040 inches is provided between the outer surface of the tubing and the outer surrounding electrode, and across this gap or space a high voltage electric current is impressed at between 10,000 and 15,000 volts to produce the corona discharge. The voltage source and other elements of the circuitry will shortly be more fully described in connection with FIG. 5.

As the corona treated tubing continues its movement along the mandrel 56 the progressive cooling provided thereby effectively sets the inner diameter of the tubing under the further control of the speed of drawing as determined by the peripheral speed of the driven rolls 21 and 22 at the station 12. The outer diameter of the tubing is generally simultaneously set or rendered firm by action of the coolant nozzles 64, the discharge from which directly impinges against the tubing for later collection from the tank drain connection 32.

It is to be noted that the corona electrode 50 is effectively shielded against the exterior water spray by the first wiping member 35 which thus functions both as a dam and as a wiper. The main wiping action is, however, effected by the second wiper 36 which generally is adequate to remove the clinging water from the traveling tubing, although as was noted an additional wiper or air jets could be positioned downstream from the wiping member 36.

It is important to note in this regard that an important advantage exists in corona treating at extrusion or during sizing and the consequent use of external coolant sprays following completion of the treatment. This lies in the fact that the water clings or adheres to the surfaces of the tubing which have been effectively corona treated, apparently because of the attractiveness of the oxidized surfaces. Accordingly, a readily visible inspection check is provided, which was not present in the prior art technique wherein corona treating was accomplished at a later stage in association with the printing apparatus. Also, as has been emphasized, there necessarily exists when treatment is effected on thermoplastic sleeves loosely received on the corona treating mandrels an air gap, which results in treatment on the inner diameter of the tubular sleeves and consequent interference with sealing and heading.

The apparatus provided by applicants for corona treating during extrusion or while the tubing is in its formative state has the important advantages noted hereinabove. However, there still exists the possibility of a short circuit occurring therewith, resulting in the chance of damage to the equiment. As for example, it may flash through a pinhole in the tubing, or even though there is a dam provided by the wiping member 35, water may collect in the corona treating area to cause the ring electrode to flash over to ground to an adjacent metallic part. Certain insulating portions of the apparatus, such as the rubber of plastic wiping and dam member 35, may then be burned or scorched.

A situation such as that described above is prevented by novel circuitry which de-energizes the corona treating transformer and provides a visual and/or audible signal to the operator in the event of a short circuit condition. Referring now to FIG. 5, transformer 75 has its output connections 52 and 59a leading, respectively, to the annular electrode 50 and to ground 59, while input terminal or connector 76 of the transformer leads to one side of a power source such as a high frequency generator (not shown). The circuit from the transformer to the generator is completed by line 77 feeding to normally closed contacts c-1 and c-2 of relay means R-2, the contacts being electrically connected by lead 77a to the other side of the power source.

Connections 76 and 77a leading to the power source are bridged by a first line 78 having therein a rectifier X-1 and a resistance Y-1 between which a circuit line 79 is taken to place a condenser Z-2 in parallel with the resistor Y-1. The connector 79 feeds through relay R-1 having normally open contacts c-3 and c-4, the relay R-1 then being electrically connected to branch line 80 connected across the power source connectors 76 and 77a. As appears, in the branch line 80 there is provided a rectifier X-2 and condenser Z-1.

The relay circuit shown in the left portion of FIG. 5 further includes a line 81 from one side of a secondary power source, such as 110v-60 cycle current, which connects through branch line 82 to a condenser Z-3. The line 82 feeds, as shown, to contact c-3 of relay R-1 and to contacts c-5 and c-7 of Relay R-2. Contact c-4 of relay R-1 feeds to relay R-2 by a line 83, and from this line is taken a connection to contact c-6 of relay R-2. Matching contact c-8 connects to power line 85 by branch connection 86 having therein rectifier X-3.

The power line 85 also has taken therefrom a connector 87 leading to contact c-9 of relay R-2, and the opposite contact c-10 of this pair leads by line 88 to relay R-3. From this same relay a line 89 feeds back to relay R-2, and off this line is taken a connector 89a to contact c-12. Contact c-11 leads through a signal light S-1 to main power line 85 which also feeds a re-set switch T-1 to contact c-14 of relay R-3. The other contact opposite to c-14, and labeled c-13, is electrically connected, as shown, to contact c-10 of relay R-2.

The circuitry described may be suitably housed, as indicated by the surrounding phantom lines, and its manner of operation is as follows. The power source in the form of a high frequency generator having an output of 150–200 v. at 2,500 cycles is illustratively set at 150v. Current then flows through rectifier X-1 and through resistor Y-1 providing at the point "r" a positive D.C. voltage of 150v. Current also flows through rectifier X-2, charging the condenser Z-1 until the voltage at point "s" is also approximately +150v. D.C. Since the voltages at "r" and "s" are equal, relay R-1 does not operate and relay R-2 remains de-energized. Under these conditions, contacts C-1 and C-2 are closed and transformer 75 is energized and the electrode 50 is impressing the requisite high level alternating voltage (15,000–20,000v.) across the gap between the electrode and outer surface of the tubular shape 20.

However, should a short circuit to ground take place by accumulations of water, the current requirements in the transformer rise, causing the voltage to drop since the generator cannot supply the additional current. Illustratively, if the voltage should drop to 100v. on the generator terminals, the voltage at point "r" will drop correspondingly. However, the voltage at point "s" remains at 150v. since condenser Z-1 must be discharged through relay R-1 as the only way to reduce the voltage. The 50v. drop between points "r" and "s," which is across relay R-1, causes this relay to operate for a brief time and trigger the circuit occupying the left portion of FIG. 5. Primarily, the condenser Z-2 maintains the voltage at point "r" at the required level, whereas without it the point "r" voltage would be about 30v. below that at point "s."

Operation of relay R-1 causes its contacts c-3 and c-4 to close, energizing relay R-2 which is supplied by rectifier X-3 and normally closed contacts c-1 and c-2 of relay R-2. The voltage at point "t" is approximately 110v. D.C., and as soon as contacts c-5 and c-6 are closed, relay R-2 is placed across condenser Z-3. The latter condenser discharges through R-2 holding it closed for approximately three-fourths of a second, and thereupon relay R-2 drops out since relay R-1 has then opened. Contacts c-7 and c-8 between points "t" and "u" keep relay R-2 across condenser Z-3 after relay R-1 has opened. Relay R-2 is thus in the right portion of the circuit of FIG. 5, and disconnects the transformer from the power supply. The signal light S-1 and connections made thereto provide a visual and/or audible signal to the operator of the presence of a short circuit, and the signal is energized whenever relay R-2 operates. It remains operating until T-1 is pushed, releasing the relay R-3.

It is thus to be seen from the foregoing that an electrical system has been devised which effectively eliminates short circuit damage to the apparatus, and which requires only relatively simple parts. Further, as was earlier noted, applicants have provided a corona treating method which assures that no internal treatment of the tubing can occur, and that by practicing the process when the tubing is in its formative stage, more effective corona is achieved. Additionally, treatment before final sizing of the outer diameter provides a clinging water film, indicating to the operator effective treatment.

Various changes have been discussed herein which come within the purview of the invention, and other modifications can obviously be effected without departing from the novel inventive concepts.

We claim:

1. Apparatus for the surface treatment and sizing of thermoplastic tubing formed by extruding heated thermoplastic material through an annular extruder nozzle, comprising:
   an elongate, internal forming member mountable at the nozzle of the extruder in closely adjacent, coaxial alignment with the extruder nozzle;
   electrode means encircling said forming member in spaced relation thereto;
   means for continuously passing said tubing along said forming member in tight fitting relation therewith to size said tubing;
   means for impressing a high alternating voltage between said electrode means and said forming member while said tubing is being sized to produce a corona discharge treatment of the exterior surface of said tubing; and
   means for cooling said tubing as it leaves the corona discharge zone, including means for internally cooling said forming member for progressively cooling the interior of said tubing, and coolant spray means disposed away from said electrode means in the direction of the discharge end of said forming member for directing a coolant spray over the exterior of said tubing.

2. The apparatus of claim 1 including wiper means disposed between said electrode means and said coolant spray means, said wiper means tightly contacting said tubing moving over said forming means thereby shielding the corona discharge zone from the coolant spray.

3. Apparatus for producing tubing as defined in claim 2, in which electrical circuit means are provided for interrupting the impression of the alternating voltage and for providing a signal indicating the presence of a short circuit condition.

\* \* \* \* \*